July 6, 1954

H. W. WALDEN 2,682,816

CAMERA AND LAMP UNIT

Filed Aug. 26, 1952

INVENTOR.
Henry W. Walden

BY Harry Radzinsky

ATTORNEY

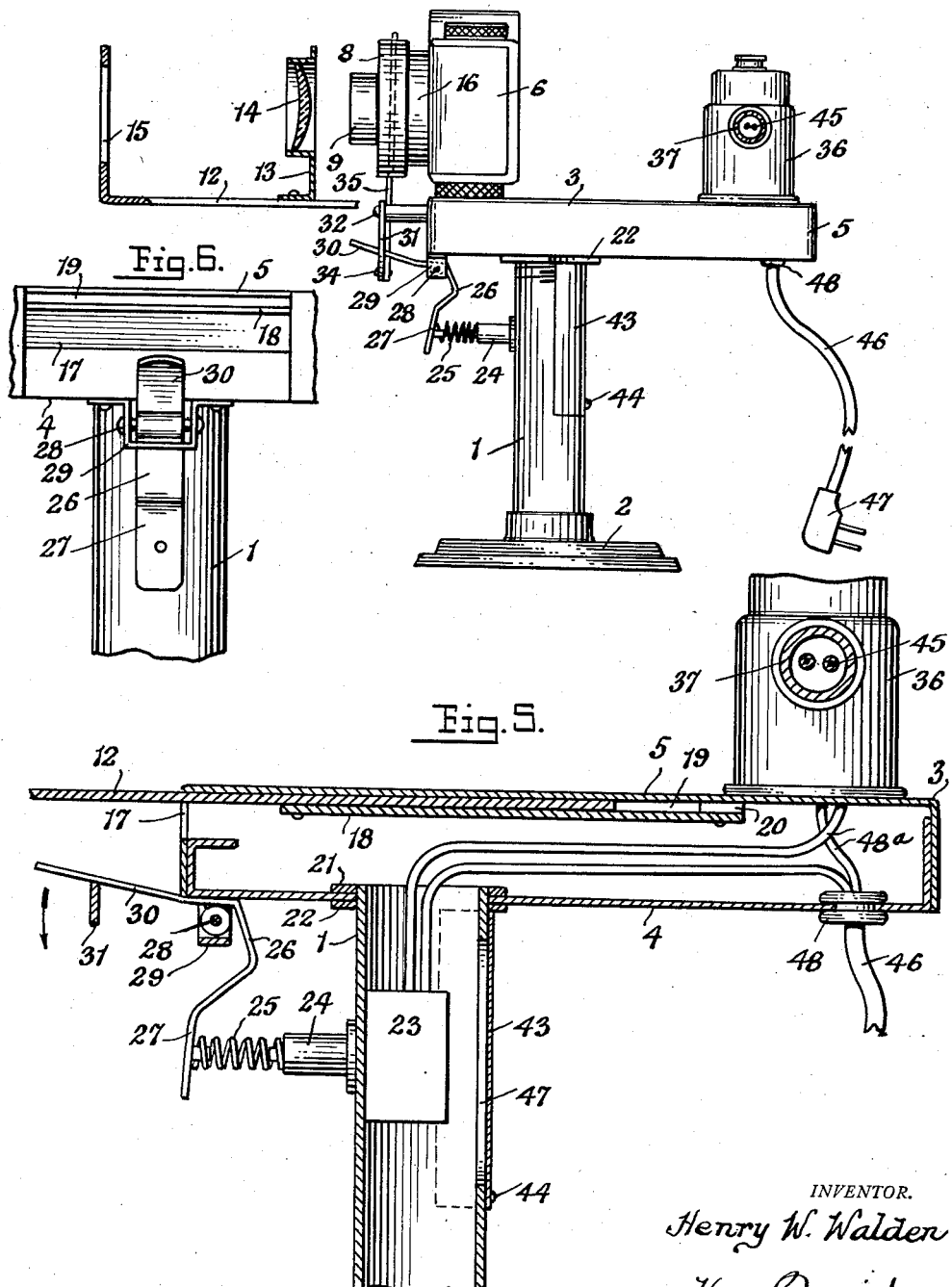

Patented July 6, 1954

2,682,816

UNITED STATES PATENT OFFICE 2,682,816

CAMERA AND LAMP UNIT

Henry W. Walden, New York, N. Y.

Application August 26, 1952, Serial No. 306,327

2 Claims. (Cl. 95—11.5)

This invention has reference to a photographic apparatus, and more particularly to a unit adapted for use in photographically recording industrial or clinical work, for micro-filming papers, documents or drawings; for copying pictures, for recording therapeutic progress, for evaluating results of surgical or other corrective procedure, and for doing so-called "close-up" photographic work of all kinds, and otherwise producing photographic records usable for a host of purposes.

An object of the invention is to provide a device of this character, consisting of a supporting base carrying a camera and which need not necessarily be of the expensive kind, illuminating means, and a single control for causing operation of the illuminating means, as well as tripping of the shutter of the camera. The invention also contemplates the provision of means by which accurate forcussing is obtained as well as an indication of the area being photographed at a given distance from the camera.

Another object of the invention is to provide, in an apparatus of this character, a simplified shutter-operating means and light control; an improved and simplified means by which focus and framing of a picture is secured and other advantages are obtained, all in a compact, inexpensive and easily portable structure.

With these objects and other objects to be hereinafter set forth in view, I have devised the particular arrangement of parts to be described and more particularly pointed out in the claims appended hereto.

In the accompanying drawings, wherein an illustrative embodiment of the invention is disclosed, Fig. 1 is a top plan view of a photographic apparatus constructed in accordance with the invention;

Fig. 4 is a side elevational view of the apparatus, with some parts shown in section and other parts fragmentarily shown;

Fig. 5 is a vertical sectional view through the base of the apparatus, with the camera removed, and Fig. 6 is a front elevational view of the shutter operating and lamp-switch controlling device.

Figure 1:
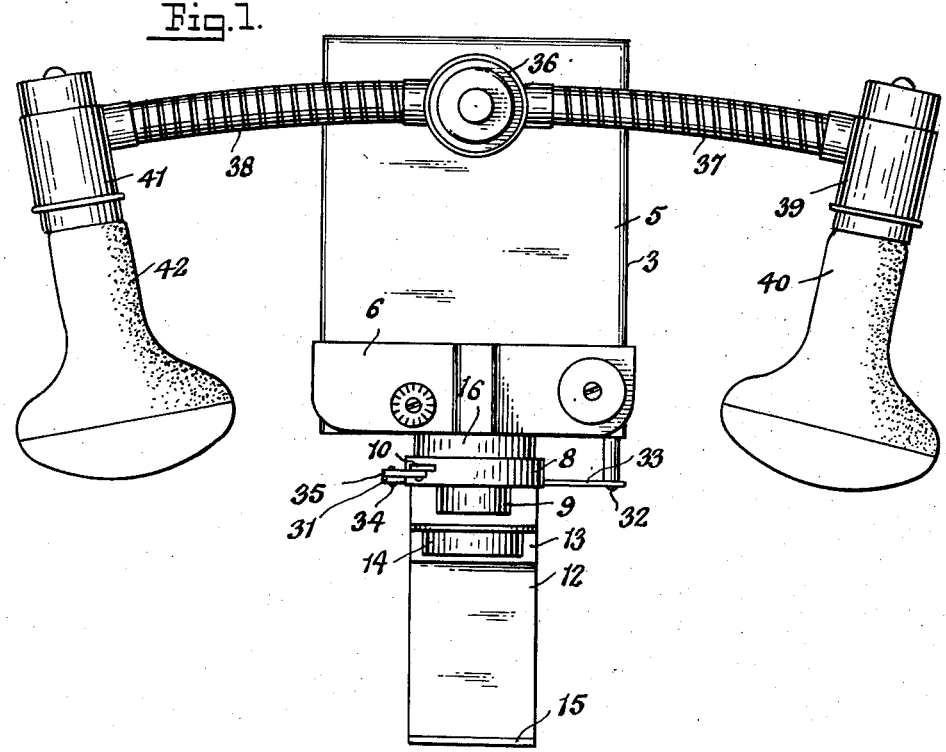
Figure 2:
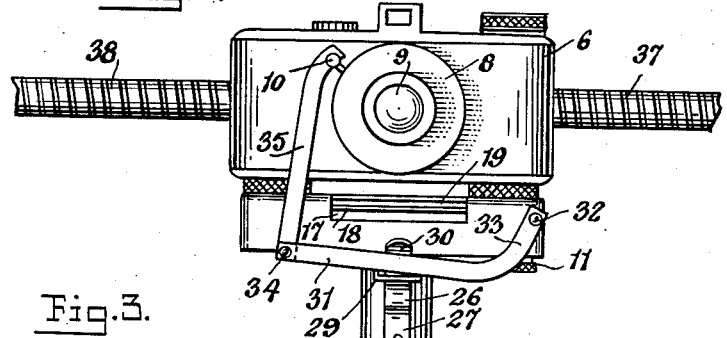
Fig. 2 is a front elevational view of the same, with the focussing and framing bar omitted and the lamps not being shown.
Figure 3:
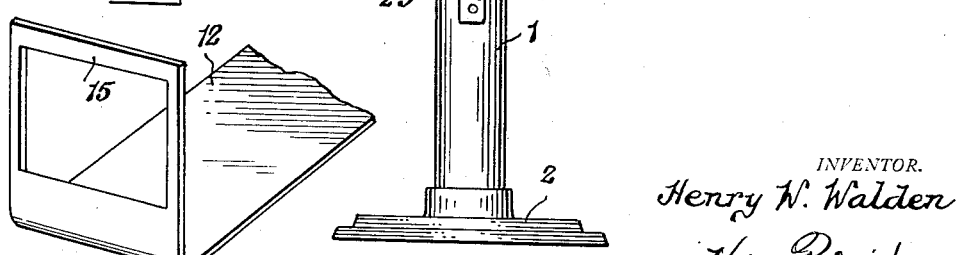
Fig. 3 is a perspective view of the forward end of the framing and focussing bar.

The base of the apparatus includes a standard or upright 1 of tubular formation, provided at its lower end with a base 2 upon which it may be rested or by which it may be attached at the top of a tripod or other suitable firm support. The base also includes a flat, rectangular, hollow casing, generally indicated at 3, and consisting of an upper section 5 telescopically fitted over a bottom or lower section 4. Screws or other fastening elements may secure the two telescoped sections 4 and 5 together.

The flat top of the casing 3 provides a seat or support for a camera indicated at 6, which may be of known construction, and if desired, of an inexpensive type, and includes the usual lens tube 16 carrying a shutter housing 8 and lens or objective 9. The camera may be removably attached to the casing by a tripod screw 11 or other suitable camera-mounting means. The shutter is adapted to be tripped by movement of a shutter-operating arm 10, projecting from the shutter housing 8 in the known manner. In some types of cameras the shutter release consists of a button located on top of the camera body and in such case a slight alteration of the shutter-operating mechanism will be found necessary, although the same will not materially differ in operation from the structure to be described.

The shutter-release arm 10 is adapted to be moved to trip the shutter by the downward movement of a link 35 having its upper end pivotally connected to the shutter arm 10, and its lower end pivotally attached at 34 to one end of a lever 31 which is curved near its opposite end, as indicated at 33 and has said curved end pivoted at 32 to the front of the casing 3. This arrangement is such that a downward pivotal movement of the lever 31 on its pivot 32 will draw down the link 35 and cause it to move the shutter release arm 10 in a manner to trip the shutter of the camera.

The lever 31 is depressed in the manner just mentioned, by means of an arm 30 of a bell-crank member 26 which is pivoted on a pin 28 mounted in a bracket 29 secured to the under side of the lower section 4 of the casing 3 near the front of the casing. The second arm 27 of the bell-crank member 26 constitutes a finger piece, and when said arm 27 is manually depressed by finger pressure, the arm 30 will be swung downwardly, as indicated by the arrow in Fig. 5, and thus caused to move the lever 31 downwardly to cause said lever to draw down the link 35 to trip the shutter.

The illuminating means for the apparatus comprises two lamps, indicated respectively at 40 and 42. The lamp 40 is received in a socket 39 secured at the end of a flexible tube 37 serving as a conduit for wiring 45 leading from the interior of the casing 3 to the socket 29. The lamp 42 is received in a socket 41 carried at the end of the flexible tube 38, similar to that shown at 37. The flexible tubes 37 and 38 are secured to and extend laterally from a hollow post 36 rising from the top of the casing 3, and the wiring from the sockets 39 and 41 extends down through the post 36 to enter the casing 3 for connection to the wires 48a extending respectively from lead-in wire 46 and the wiring from a switch 23 mounted within the tubular standard 1. An insulating grommet 48 is mounted in a hole in the lower section 4 of the casing and the lead-in wires 46 enter into the casing through said grommet. A plug 47 enables wires 46 to be connected to the conventional electrical outlet.

The switch 23, which is in the circuit leading to the sockets 39 and 41, is fitted into the tubular standard 1 through an opening 47 in the side wall of the standard, which opening is normally closed by a removable plate 43 secured in place over the opening 47 by means of a screw 44 or other suitable fastening element. The top of the standard 1 is attached to the lower half 4 of the casing 3 by fitting in a hole provided in the bottom 4 and being held in place by the nuts 21 and 23 threadable on the standard and acting to clamp the lower half 4 of the casing between them.

It will be noted from the foregoing, that the shutter will be tripped and the lamps 40 and 42 will be illuminated by operation of a single control, namely, by means of the bell-crank member 26. This arrangement is such that when the finger-piece 27 is pressed, the switch 23 will be closed and the lamps 40 and 42 illuminated. This occurs before the shutter is tripped, the tripping of the shutter taking place upon further depression of the finger-piece. In other words, to take a picture, it is merely necessary for the photographer to press the finger-piece 27; the lamps will be illuminated and then the shutter will be tripped. Upon release of pressure on the finger-piece 27, the switch will open, and the shutter arm 10 will spring back to its former position.

To enable close-up pictures to be taken, such as required for medical, dental or other purposes, or for stamps, copying pictures, photographing jewelry or other small objects, a focussing and framing device is employed. This may consist of an elongated bar or strip 12, adapted to be slidably fitted through an aperture 17 in the forward end of the casing 3, to be accommodated in a guideway 19 formed between a plate 18 and the under side of the top plate of the top member 5 of the casing 3, as seen in Fig. 5. Spacers 20 position the plate 18 away from the top of the casing and provide the guideway 19 into which the end of the framing and focussing bar 12 is fitted. At its forward end, the bar 12 is provided with a vertical portion in the form of a frame 15 serving to define within it the area which will be photographed when a bar 12 of a given length, and provided with a required supplemental lens 14 is used. Such supplemental lens 14 is carried by a lens-mount 13 in the form of a bracket secured to the bar 12.

These bars 12, the frames 15 thereon and the lenses 14 carried by the bars, may be provided in different sizes and arrangements to meet various photographic requirements, such as the distance at which an article is to be photographed; the size of the object or area to be photographed and other factors. In each instance, the bar 12 to be used has its end slid into the guideway 19 for an indicated distance, or until the supplemental lens 14 reaches the lens 9 and is located directly in front of it and centered with it. To take a picture, it is then merely necessary to place the frame against or around the object to be photographed and then press the finger-piece 27. Upon first pressure imposed on the finger-piece the lamps 40 and 42 will be illuminated and as the pressure continues, the shutter will be tripped and the picture thus taken. Since the distance of the frame 15 from the camera lens, coupled with the use of a close-up lens 14 will accurately determine the focus, the camera need not necessarily be of the focussing type, yet a clear and accurate picture will result.

Having described one embodiment of the invention, it is obvious that the same is not to be restricted thereto, but is broad enough to cover all structures coming within the scope of the annexed claims.

What I claim is:

1. A photographic apparatus comprising, a hollow standard terminating at its lower end in an enlarged base on which the standard is rested on a flat support, a hollow, flat-topped casing secured on the top of the standard, a camera mounted on the top of the casing, illuminating means mounted on the base and including a lamp located at each side of the camera, a switch contained within the standard below the casing, said switch having an operating button located outside of the standard wiring entering the standard and connected to the switch, said wiring being also contained within the casing and extending to the illuminating means, a lever pivotally mounted exteriorly of casing and at the under side of the casing adjacent to the forward end of the same, said lever having a finger-piece operative to close the switch, a linkage pivoted on the front of the casing and being wholly disposed exteriorly of the casing and extending upwardly to engage the shutter control of the camera, a portion of the lever taking over a part of the linkage forwardly of the casing to thereby depress the linkage to cause shutter operation directly after the switch is closed, and a framing and focussing device for the camera comprising a bar having a frame at its forward end and a supplemental lens spaced from the frame, the bar having an end slidable within the casing to bring the supplemental lens to or from the lens of the camera, and means located within the casing for receiving the part of the strip that is inserted within the casing.

2. A photographic apparatus comprising, a hollow standard, a hollow, flat-topped casing mounted at the top of the standard, a camera mounted on the top of the casing, illuminating means mounted on the casing and including a lamp located at each side of the camera, a switch contained within the standard below the casing and having a push-button control on the outside of the standard, wiring entering the standard and connected to the switch said wiring also extending through the casing and being connected to the illuminating means, a pivoted lever pivotally mounted on the bottom of the casing adjacent to its forward end and externally of the casing, said lever having a dependent finger-piece, behind which the push-button control is arranged externally of the standard, whereby manual depression of the finger-piece will operate the switch, a link pivoted at one end on the front of the casing, the lever having an arm extending over the top of the link and operative to swing said link downwardly upon its pivot when the finger-piece of said lever is depressed, an arm connected at one end to the shutter operating means of the camera, the second end of the arm being pivotally attached to the second end of the lever, and spring means interposed between the finger-piece and the switch to thereby normally hold the lever in an inoperative position.

References Cited in the file of this patent

UNITED STATES PATENTS

| Number | Name | Date |
| --- | --- | --- |
| 1,837,704 | Dean | Dec. 22, 1931 |
| 2,072,390 | Hartingsvelt | Mar. 2, 1937 |
| 2,239,379 | Bucky | Apr. 22, 1941 |
| 2,244,409 | Upton | June 3, 1941 |
| 2,261,953 | Brown | Nov. 11, 1941 |
| 2,314,033 | Curran | Mar. 16, 1943 |
| 2,403,892 | McFarlane et al. | July 9, 1946 |
| 2,590,916 | Back | Apr. 1, 1952 |